March 1, 1927.
J. E. PERRAULT
1,618,993
AUXILIARY TOOL HOLDER FOR LATHES AND THE LIKE
Filed Sept. 28, 1925
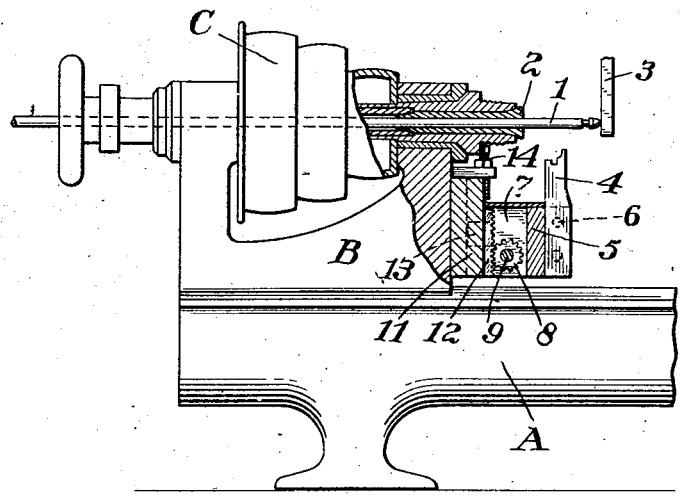
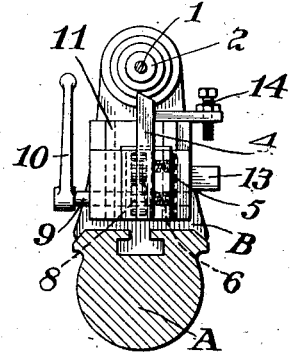
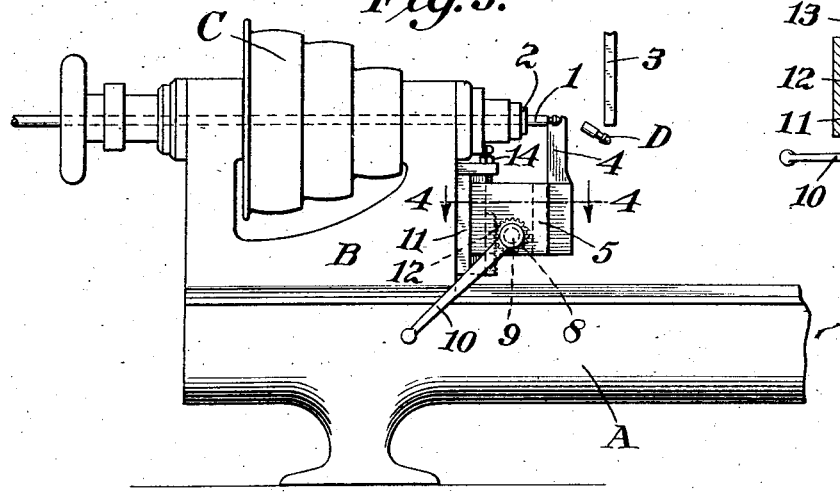
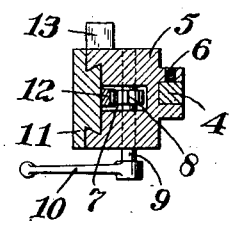
Inventor:
Joseph E. Perrault,
by Middleton, Donaldson & Hall
Attys.

Patented Mar. 1, 1927.

1,618,993

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

AUXILIARY TOOL HOLDER FOR LATHES AND THE LIKE.

Application filed September 28, 1925. Serial No. 59,161.

The invention concerns an improvement in lathes, and is in the nature of an attachment to a lathe of ordinary form.

In the accompanying drawings:—

Figure 1 is a part side elevation and part sectional view of a portion of a lathe embodying the invention.

Fig. 2 is a cross sectional view looking from the right of Fig. 1.

Fig. 3 is a side elevation of the parts shown in Fig. 1.

Fig. 4 is a sectional plan view on the line 4—4 of Fig. 3.

In these drawings, A indicates the base of the lathe, and B the head stock, which is mounted in the ordinary manner upon the base A, the latter being provided with the ordinary form of guideway for the head stock. C indicates the pulleys by which the head is driven.

The attachment is illustrated in the present form of the invention as operating upon stock of bar or rod form, though it will be understood that the invention is not limited in this respect.

In the drawings the rod stock is indicated at 1, this being located axially in the head and being held by the collet 2. A stop 3 determines the position of the stock rod. The rod is operated upon by a tool 4 which is adapted to both form the end of the rod and sever the formed end from the stock. The tool 4 is carried by a slide or carriage 5 which has a seat or pocket in which the tool is mounted, being held therein by a set screw or screws indicated at 6. The carriage 5 is adapted to move vertically on a guideway of dovetailed form provided on a base plate 11, which is secured to the on a base plate 11, which is secured to the front face of the head stock B immediately above the base A. This guideway has centrally mounted thereon a toothed rack 12.

The carriage 5 has a recess 7 in which is located a pinion 8 on a shaft 9, the said pinion meshing with the rack and the said shaft having an end lever 10 by which the shaft may be turned so as to raise the carriage 5 and present the tool to the rod or stock 1 for its action thereon. The upward movement of the carriage 5 is limited by a set screw 14 against which a pin 13 on the carriage contacts. The screw may be set at different positions for regulating the height to which the carriage 5 may be moved.

In the operation of the invention the stock or rod is rotated with the head and the operator advances the tool 4 vertically by turning the hand lever 10, and Fig. 3 illustrates the result of this operation, it being noted that the tool will sever the end of the rod, indicated at D, which end has been shaped by the operation of the tool during the previous action. In severing the end portion of the rod from the main portion, as indicated in said Fig. 3, the main portion of the rod will be shaped by the tool to the desired form, and in the next action of the tool upon the rod, this shaped portion of the rod will be severed and the end portion of the rod itself will be shaped by the tool, this action being repeated as many times as desired.

It will be noted that the attachment occupies a position where it does not interfere with the ordinary operations of the lathe, the space in which the attachment is placed being directly adjacent the head stock, and below the axis of the rotary head.

I have shown only enough of the lathe as will make clear the application of my invention, it being understood that the lathe will have the ordinary tail stock.

The stop 3 may be supported in any suitable way.

I claim as my invention:—

In combination with the head stock of a lathe, a rotary head mounted therein, a vertically disposed undercut guideway mounted on said head stock below the axis of the rotary head of the lathe, a vertically movable recessed carriage member mounted on said undercut guideway, a toothed rack mounted on the guideway, a pinion meshing with the rack and located in the recessed carriage, a shaft extending through the carriage on which the pinion is mounted, a lever for operating the shaft, and a tool on the carriage which is moved towards and from the axis of the rotary head of the lathe by the movement of the carriage, substantially as described.

In testimony whereof I affix my signature.

JOSEPH E. PERRAULT.